Sept. 27, 1927.
A. G. WAGNER
1,643,729
GEAR SHIFTING MECHANISM
Filed Oct. 23, 1925
4 Sheets-Sheet 4
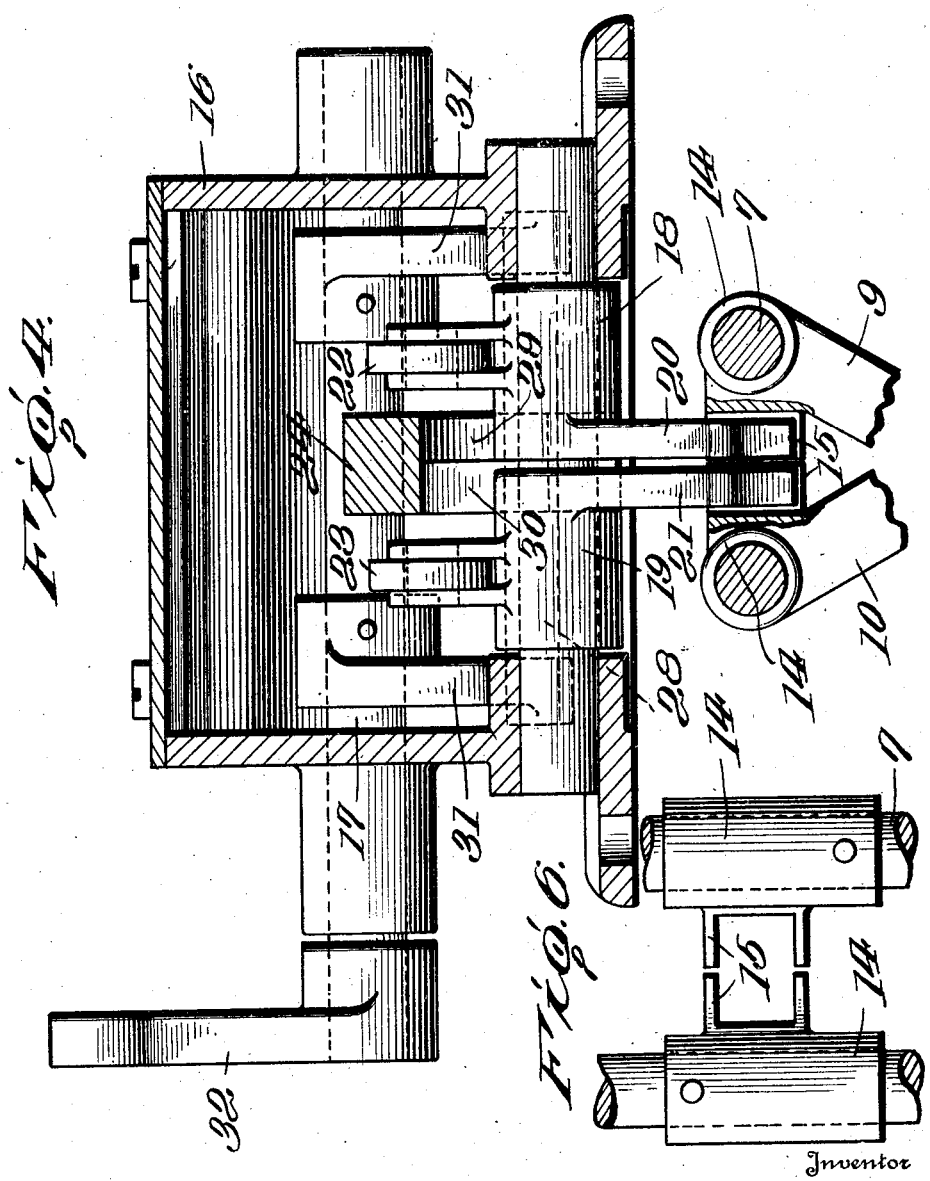
Inventor
ALBERT G. WAGNER
By Riordon & Riordon
Attorneys Patented Sept. 27, 1927.

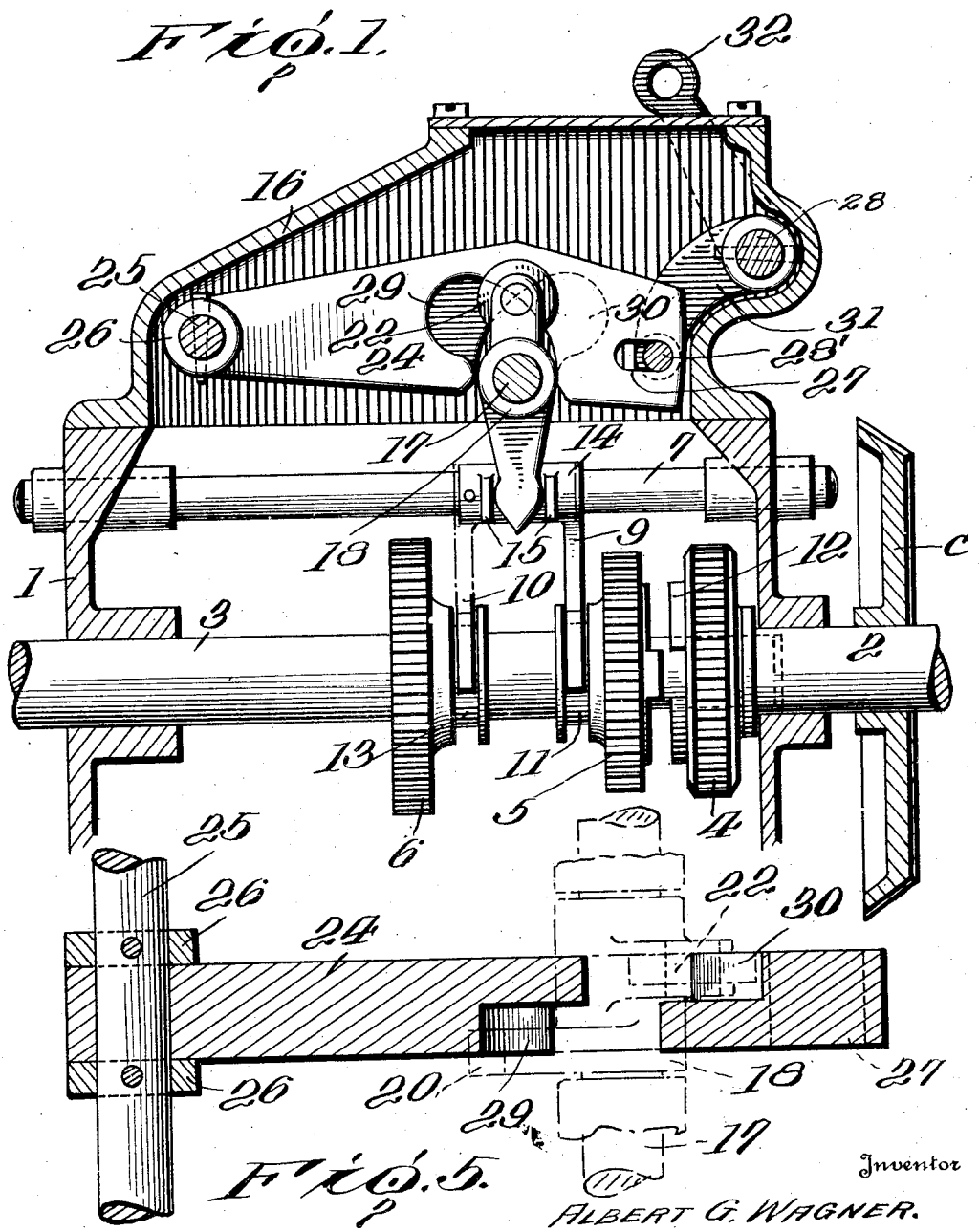

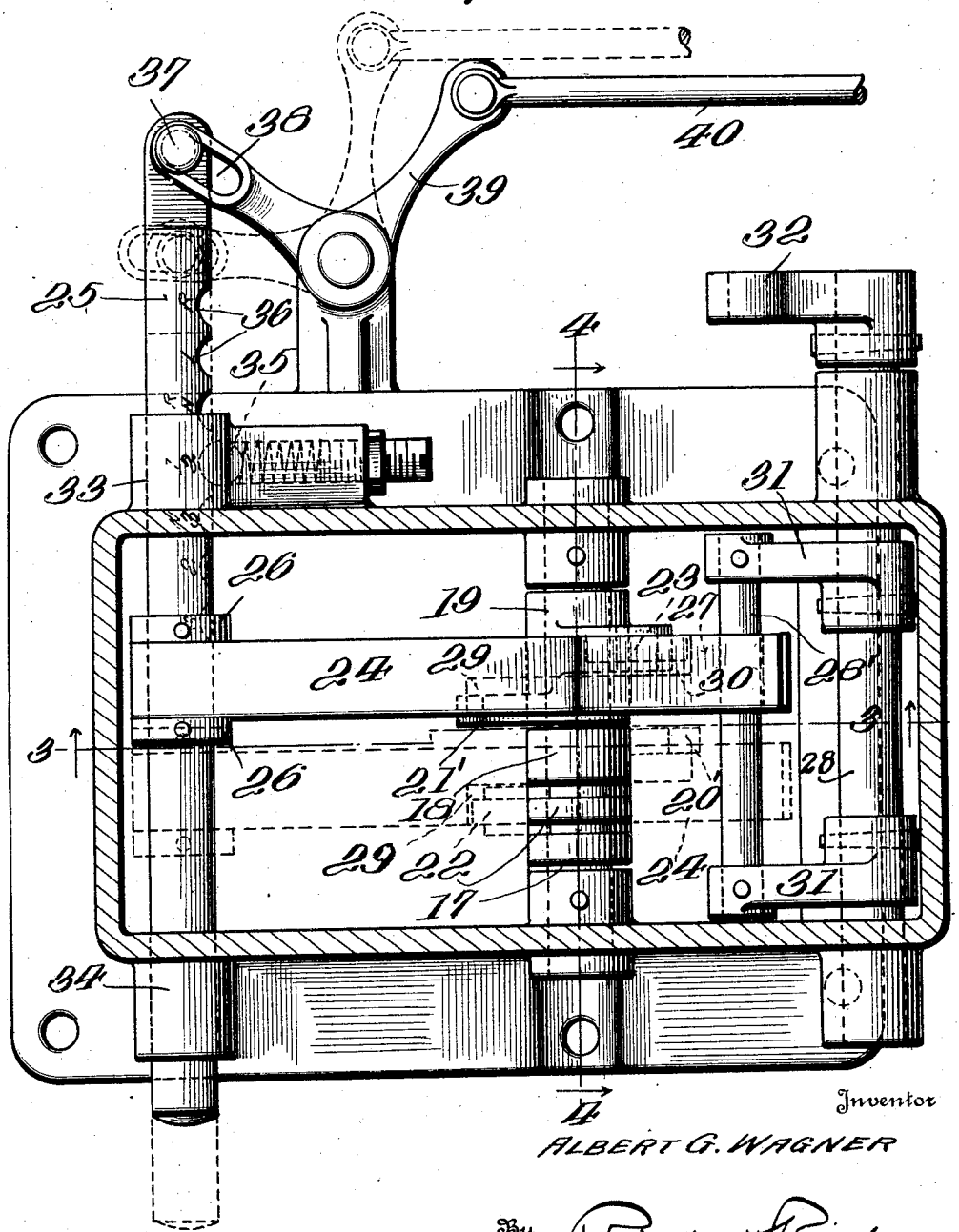

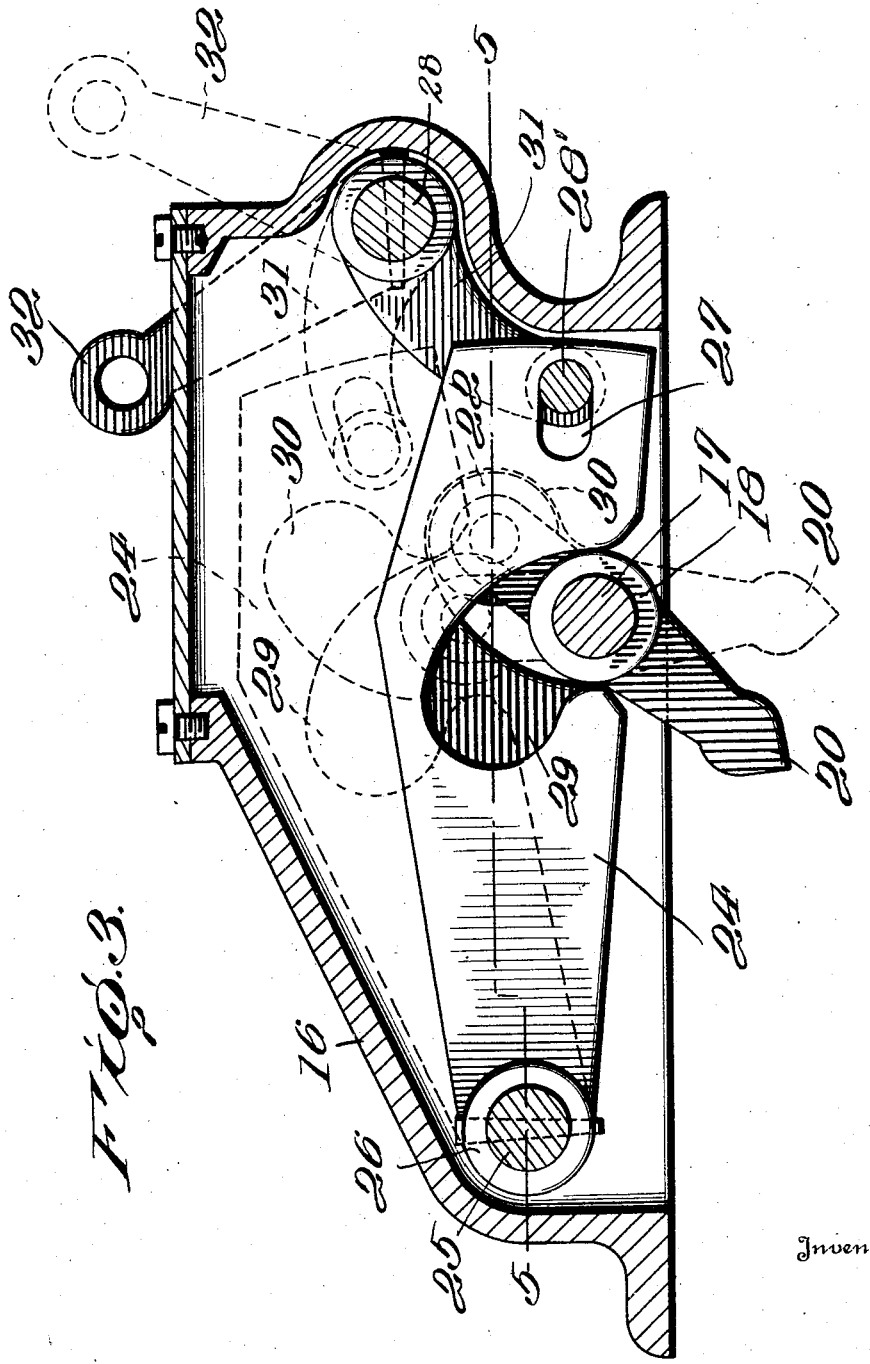

1,643,729

UNITED STATES PATENT OFFICE.

ALBERT G. WAGNER, OF CINCINNATI, OHIO, ASSIGNOR TO THE WEMB COMPANY, OF CINCINNATI, OHIO, A CORPORATION OF OHIO.

GEAR-SHIFTING MECHANISM.

Application filed October 23, 1925. Serial No. 64,369.

This invention relates to gear shifting mechanism for automobiles and the object of my invention is to provide a selective gear shifter, that is one in which the gears may be set for the desired gear only when the clutch is disengaged, the re-engagement of the clutch automatically completing the shifting of the gear.

Another object of the invention is to provide a selective gear shifting mechanism of compact form which may be enclosed within a cover of such shape that it may replace the ordinary cover of a transmission case.

I accomplish the above and other objects of the invention which will be apparent as the description proceeds by means of the device shown in the accompanying drawings in which Figure 1 is a sectional elevation of the improved selective gear shifting mechanism as applied to the transmission case of an automobile;

Figure 2 is a top plan view of the gear shifting mechanism, the cover therefor being shown in section;

Figure 3 is a vertical section of the gear shifting mechanism on the line 3—3 of Fig. 2;

Figure 4 is a section on the line 4—4 of Fig. 2;

Figure 5 is a section on the line 5—5 of Fig. 3 showing the selector body and the parts engaged thereby in dotted lines; and Figure 6 is a top plan of the shifting fork connection.

On the drawings in which like reference characters indicate like parts on all the figures thereof, 1 indicates the transmission case of an automobile, in which is mounted at one end of the usual clutch shaft on which is carried the clutch C. In alignment with the clutch shaft 2 is a transmission shaft 3 adapted to be clutched thereto. Fixed upon the clutch shaft is a gear 4, and slidably mounted on the transmission shaft 3 and rotatable therewith are the gears 5 and 6. The gears 4, 5 and 6 are adapted to mesh with change speed gears on an idler shaft (not shown) as is common in change speed gearing of the usual type.

Mounted in the upper part of the transmission case are two slide rails 7, 8 which carry the gear forks 9, 10, respectively. In order to hold the slide rails in the selected position, they may be and preferably are provided with three notches which are adapted to be engaged by spring pressed ball plungers mounted in suitable bores in the transmission case cover. One extremity of the hub of gear 5 is provided with a groove 11 around which the shifting fork 9 is adapted to fit, the opposite extremity of the hub being formed to engage the clutch 12 to couple the shaft 2 to the shaft 3. The hub of the gear 6 is likewise provided with a similar groove 13 into which the fork may be moved. The gears 5 and 6 may thus be shifted on the transmission shaft by the shifting forks 8, 9, the gear 5 to mesh with the second and third speed gears and the gear 6 with first and reverse.

The shifting forks 9 and 10 are each provided with a sleeve 14 by means of which they are secured to the slide rails 7, 8. Each sleeve is provided with two lugs 15 between which the cooperating shifting lever is adapted to fit when it is desired to move the slide rail and the fork into engagement with the gear hub. The forks are secured to the sleeves in such position that they are angularly disposed with respect to each other as shown in Figure 4, so that they will properly span the transmission shaft but will avoid interference with each other.

In order to operate the slide rails and the shifting forks according to the setting of a selector rod, while the clutch is disengaged, I have provided the following mechanism enclosed within a suitable supplemental case 16 which may be substituted for the usual cover of the transmission case and which serves to protect the mechanism contained therein.

Disposed within the supplemental case above the slide rails is a transverse rock shaft 17 on which are rotatably supported the two shifting levers 18, 19. These levers are provided with downwardly extending portions 20, 21 which engage with and operate the gear forks 9, 10, and are provided also with upwardly extending portions 20', 21' which carry rollers 22, 23 for a purpose to be later explained.

Mounted above the shifting levers 18 and 19 and adapted to engage the same is a shifting element 24. This shifting element has a bearing fit at one end on the slidable selector rod 25 being supported thereon between collars 26 pinned on the rod. The opposite extremity of the shifting element is provided with an elongated slot 27 through which passes a rod 28'.

The shifting element 24 is formed with two cam faces 29, 30 on opposite sides thereof in which the rollers 22, 23 of the shifting levers 18, 19 are adapted to ride. The rod 28 may be operated to rock the shifting element 24 on the selector rod 25 through the medium of lever 31 pinned to a shaft 28 which is operated in its turn by the clutch pedal levers 32.

The selector rod 25 is mounted in sleeves 33, 34 in the transmission case, the sleeve 33 being bored to receive a spring pressed ball plunger 35. The selector rod is provided with notches 36 into which the plunger 35 is adapted to engage providing means to maintain the selector rod in the desired position.

The selector rod 25 is provided at its outer end with a stud 37 which is engaged in a slot 38 in one end of an angle lever 39 which is fulcrumed at its angle upon the side of the transmission case and which is operable through the medium of a setting rod 40 conveniently located on the steering wheel or other suitable place near the chauffeur.

In order to operate the gear setting mechanism which constitutes this invention, the clutch is first disengaged by depressing the clutch pedal, whereupon the lever carried thereby lifts the shifting element 24 to the position shown in dotted lines in Figure 3 through the medium of the levers 31 and the shaft 28. This movement of the shifting element 24 actuates the shifting lever 18 or 19, with which it is in engagement, the rollers 22 or 23 carried thereby riding in the cam recesses 29 or 30, thus throwing the levers into neutral position. It is to be noted that one of the levers only will be in engagement with the shifting element at one time, the other lever being in neutral position. This movement of the lever will take place upon operation of the shifting element regardless of the previous position of the lever.

The levers being in neutral position and the shifting element in its upper position, it may then be moved to engagement with the desired lever to effect the desired gear shift. To accomplish this result, the setting rod 40 is actuated to move the selector rod 25 inward so that the shifting element 24 secured thereto will be moved to the corresponding position where it may operatively engage one of the shifting levers 18 and 19. In the event that the selector rod is moved to a neutral position the shifting element will be moved thereby to a position between the two shifting levers. The selector rod is held in the selected position by the engagement of the spring pressed plunger 35 with one of the notches 36.

The shifting rod having been moved to the selected position over the lever which operates the desired gear, the clutch is reengaged. When the clutch is reengaged, the shifting element will return to the full line position shown in Fig. 3. During this return movement of the shifting element, the roller on the shifting lever will ride in the cam recess with which it is engaged and the gear fork engaging portion of the lever will operate the respective gear fork and slide rail, thus effecting the engagement of the gear corresponding to the setting of the selector rod.

It is to be noted that the selector rod may be moved to a selected position only while the clutch is disengaged and the shifting element is in its upper position, the shifting levers being then in neutral position.

Having thus fully described my invention, what I claim as new and desire to secure by Letters Patent of the United States is:—

1. In a selective gear shifting mechanism, including a clutch, a slidable selector rod, a shifting element secured thereto, a rockably mounted shaft, one end of said shifting element being connected to said shaft, gear shifting levers adapted to be selectively engaged by said shifting element for movement to gear engaging and neutral positions, means whereby the disengagement of the clutch will rock the shifting element to move the levers to neutral position.

2. In a selective gear shifting mechanism, including a clutch, a slidable selector rod, a rockably mounted shaft, a shifter element pivoted at one end to the selector rod and loosely connected to the shaft at its other end, gear shifting levers mounted below said shifter element and adapted to be selectively engaged thereby for movement to gear engaging and neutral positions, connections between the clutch and the shaft whereby the disengagement of the clutch will rock the shaft and shifting element to move the levers to neutral position.

3. In a selective gear shifting mechanism, a combined clutch control and gear shifting pedal, a pivotally mounted shifting element, a gear actuating lever cooperating therewith, means on said shifting element for moving said lever to gear actuating or neutral position, and means whereby actuation of the pedal moves the shifting element on its pivot to an inoperative position, and means whereby the movement of the shifting element to its inoperative position moves the lever to its neutral position.

4. In a selective gear shifting mechanism, a slidable selector rod, a rockably mounted shaft, a shifting element pivoted at one end to the selector rod and loosely connected to the shaft at its other end, gear shifting levers mounted below said shifting element and adapted to be engaged thereby, said shaft being adapted to rock the shifting element to one extreme position to move the gear shifting levers to neutral position and to rock it to a second extreme position to selectively move one of said levers to gear shifting position.

5. In a selective gear shifting mechanism, the combination of a shifting element, a gear actuating lever cooperating therewith, inclined means on said shifting element for moving said lever to gear actuating position or to neutral position, clutch disengaging means for moving said shifting element on its pivot thereby actuating the lever to neutral position, and means whereby the shifting element may be moved in a transverse direction for setting the same only when the lever is in neutral position.

6. In a gear shifting mechanism, a plurality of pivotally mounted gear shifting levers, a shifting element, said shifting element having cam recesses on the opposite faces thereof, means on said gear shifting levers adapted to ride in said cam recesses, whereby said gear shifting levers are moved in opposite directions on their pivots.

In testimony whereof I hereunto affix my signature.

ALBERT G. WAGNER.